(12) United States Patent
Xiao et al.

(10) Patent No.: US 6,168,311 B1
(45) Date of Patent: Jan. 2, 2001

(54) SYSTEM AND METHOD FOR OPTICALLY DETERMINING THE TEMPERATURE OF A TEST OBJECT

(75) Inventors: Guoqing Xiao, San Jose; Mario John Paniccia, Santa Clara, both of CA (US)

(73) Assignee: Checkpoint Technologies LLC, Santa Clara, CA (US)

( * ) Notice: Under 35 U.S.C. 154(b), the term of this patent shall be extended for 0 days.

(21) Appl. No.: 09/172,716

(22) Filed: Oct. 13, 1998

(51) Int. Cl.$^7$ .............................. G01K 11/00; G01J 1/04; G01J 1/42; G01J 5/00
(52) U.S. Cl. ..................... 374/161; 250/227; 250/342; 374/121
(58) Field of Search .................................... 374/161, 129, 374/120, 121, 130, 123, 136, 127, 1, 5; 250/227, 342

(56) References Cited

U.S. PATENT DOCUMENTS

| | | | |
|---|---|---|---|
| 4,671,651 | * | 6/1987 | Toyoda et al. .......................... 356/44 |
| 4,973,853 | * | 11/1990 | Leonard et al. ..................... 250/574 |
| 4,984,903 | * | 1/1991 | Sweeney ............................... 374/123 |
| 5,102,231 | * | 4/1992 | Loewenstein et al. .............. 374/129 |
| 5,302,830 | | 4/1994 | Shivanandan ........................ 250/342 |
| 5,350,236 | * | 9/1994 | Thakur et al. ........................ 374/161 |
| 5,474,381 | * | 12/1995 | Moslehi ................................ 374/161 |
| 5,568,978 | * | 10/1996 | Johnson et al. ...................... 374/161 |
| 5,645,351 | * | 7/1997 | Nakata et al. ........................ 374/161 |
| 5,683,180 | * | 11/1997 | De Lyon et al. ..................... 374/161 |
| 5,725,903 | * | 3/1998 | Rostoker ................................. 427/58 |
| 5,755,512 | * | 5/1998 | White .................................... 374/161 |
| 5,783,804 | * | 7/1998 | Burke et al. .......................... 219/494 |
| 5,955,754 | * | 9/1999 | Azuma et al. ........................ 257/295 |

OTHER PUBLICATIONS

"Infrared Light Emission From Semiconductor Devices", D.L. Barton, P. Tangyunyong, J.M. Soden, A.Y. Liang, F.J. Low, A.N. Shivanandan, G. Donohoe, pp. 9–17, Proceedings of the 22nd International Symposium for Testing and Failure Analysis, Nov. 18–22, 1996, Los Angeles, CA.

"Photoemission Microscopy [PEM]", Christian Boit, 19 pages. Date and source to be determined; will file details in a supplemental format, (no dates).

* cited by examiner

Primary Examiner—G. Bradley Bennett
Assistant Examiner—Gail Verbitsky
(74) Attorney, Agent, or Firm—Flehr Hohbach Test Albritton & Herbert LLP

(57) ABSTRACT

A system and method are disclosed for optically measuring the temperature of a packaged integrated circuit (IC). A light beam is focused inside the IC package onto a region of the integrated circuit whose temperature is to be measured. The through-substrate reflectivity of the IC, which is a function of temperature and material characteristics (e.g., doping) of the region, determines how much of the incident light is reflected to a photo-detector. The photo-detector measures the intensity of the reflected light and generates a corresponding through-substrate reflectivity signal R. The reflectivity signal R is correlated with transmission curves for that region or materials with similar characteristics and the temperature of the region determined therefrom. Confocal techniques can be applied to substantially reduce measurement signal noise due to light reflected from the IC package which interferes with the light reflected from the IC. Measurements can be made at one specific position within the IC or a temperature map can be produced for the entire IC. Because different IC layers with different material characteristics have different transmission properties at the same temperature, the temperature measurement of a multi-layer region can be localized to a particular layer by selecting a measurement wavelength at which that region's transmission properties are most sensitive to temperature variations.

39 Claims, 7 Drawing Sheets

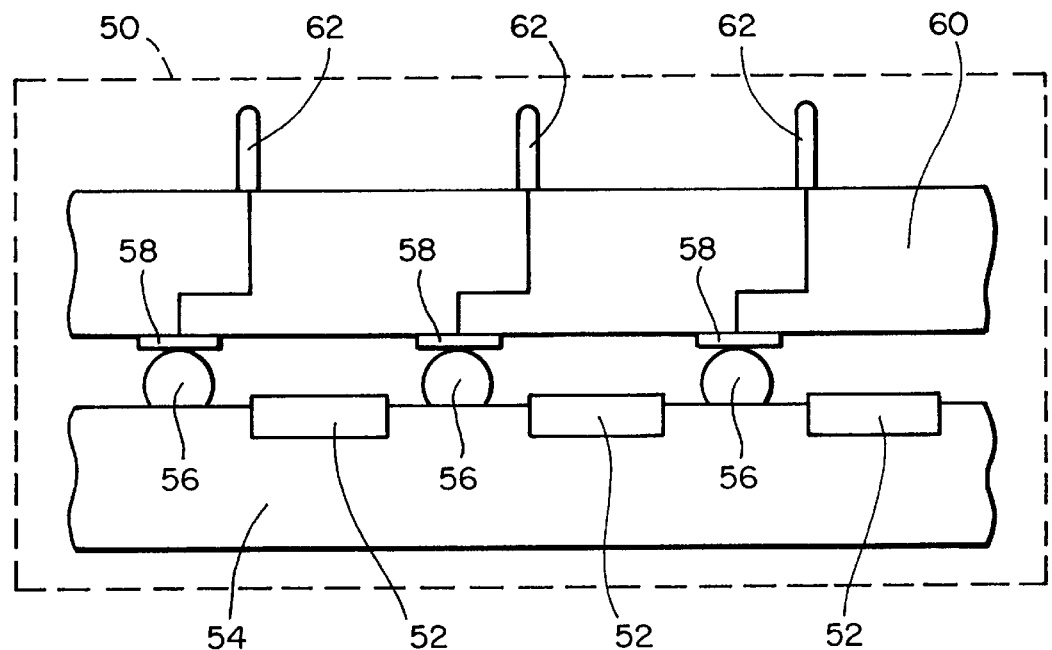
FIG_1
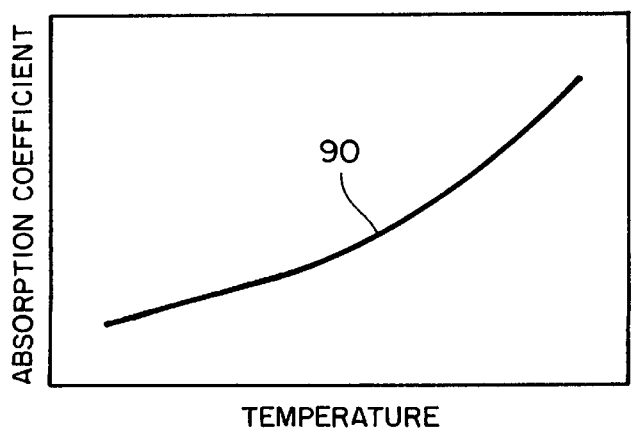
FIG_2

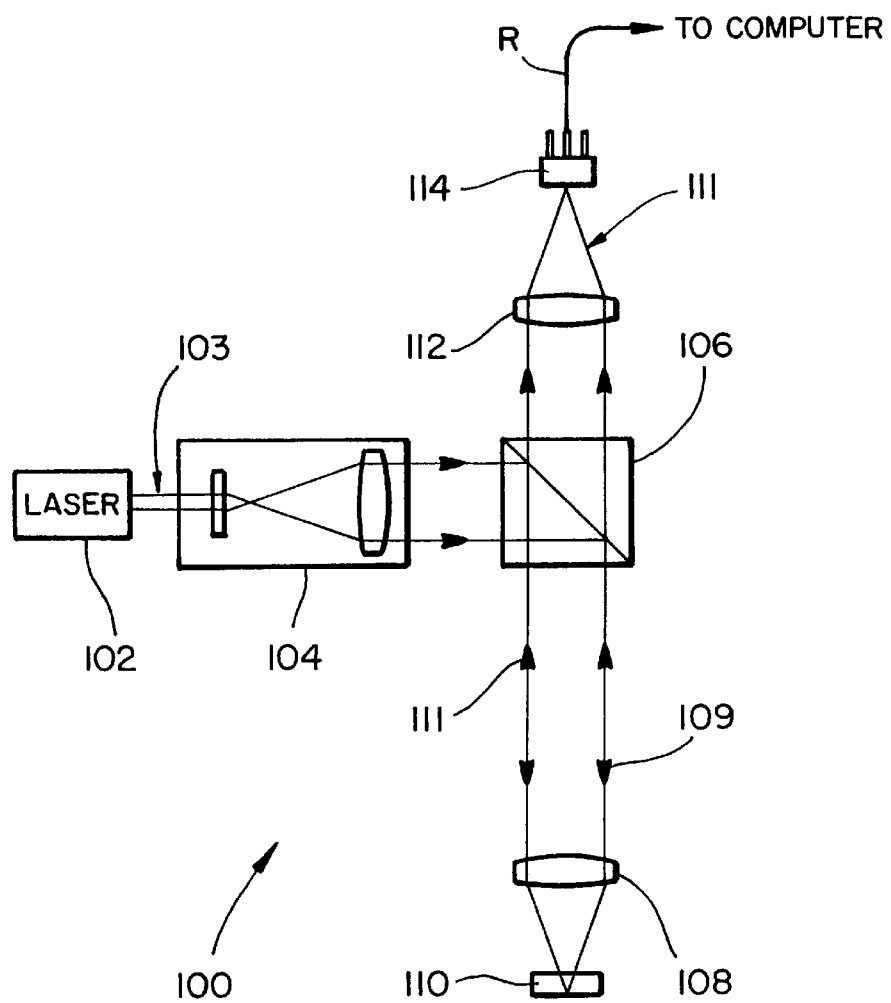
FIG_3
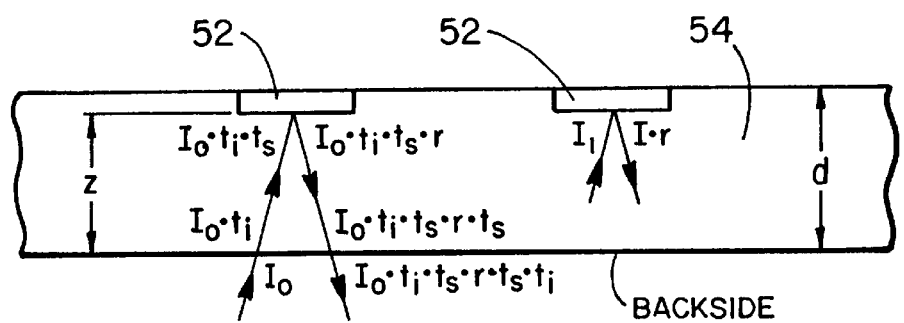
FIG_4

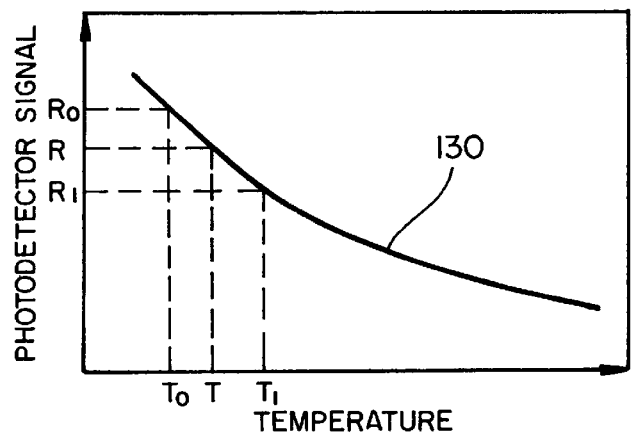
FIG_5
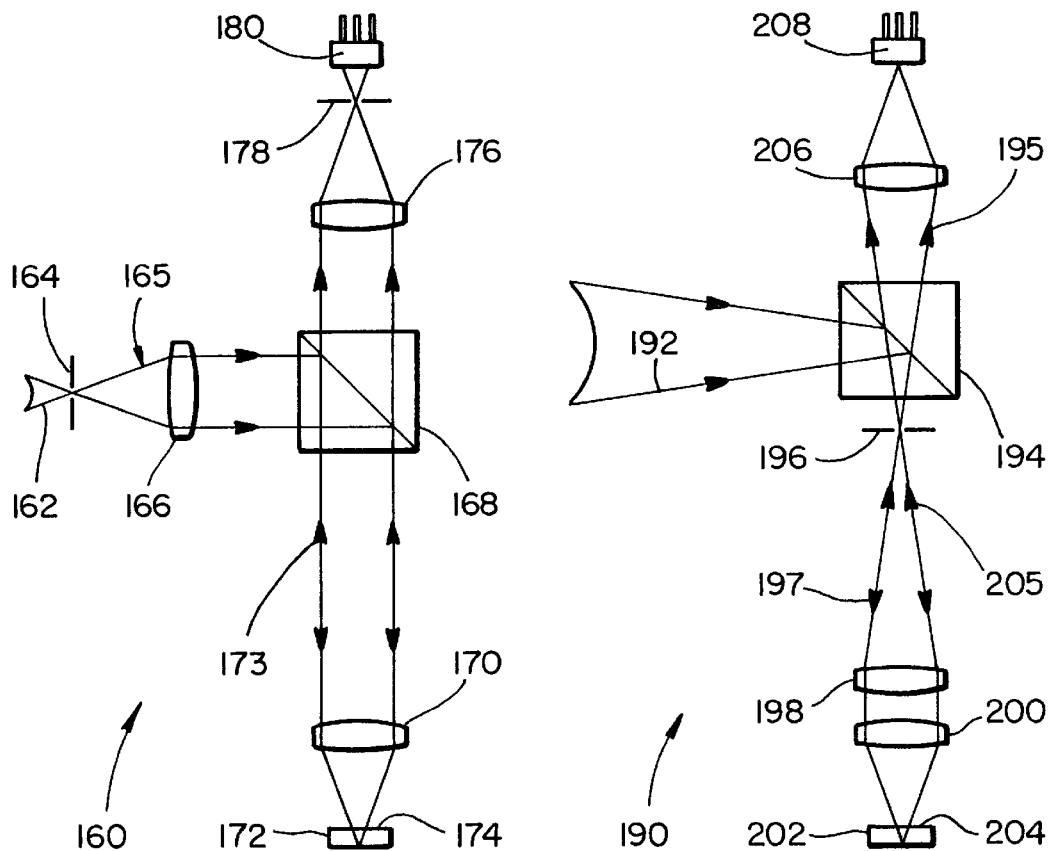
FIG_6A  FIG_6B

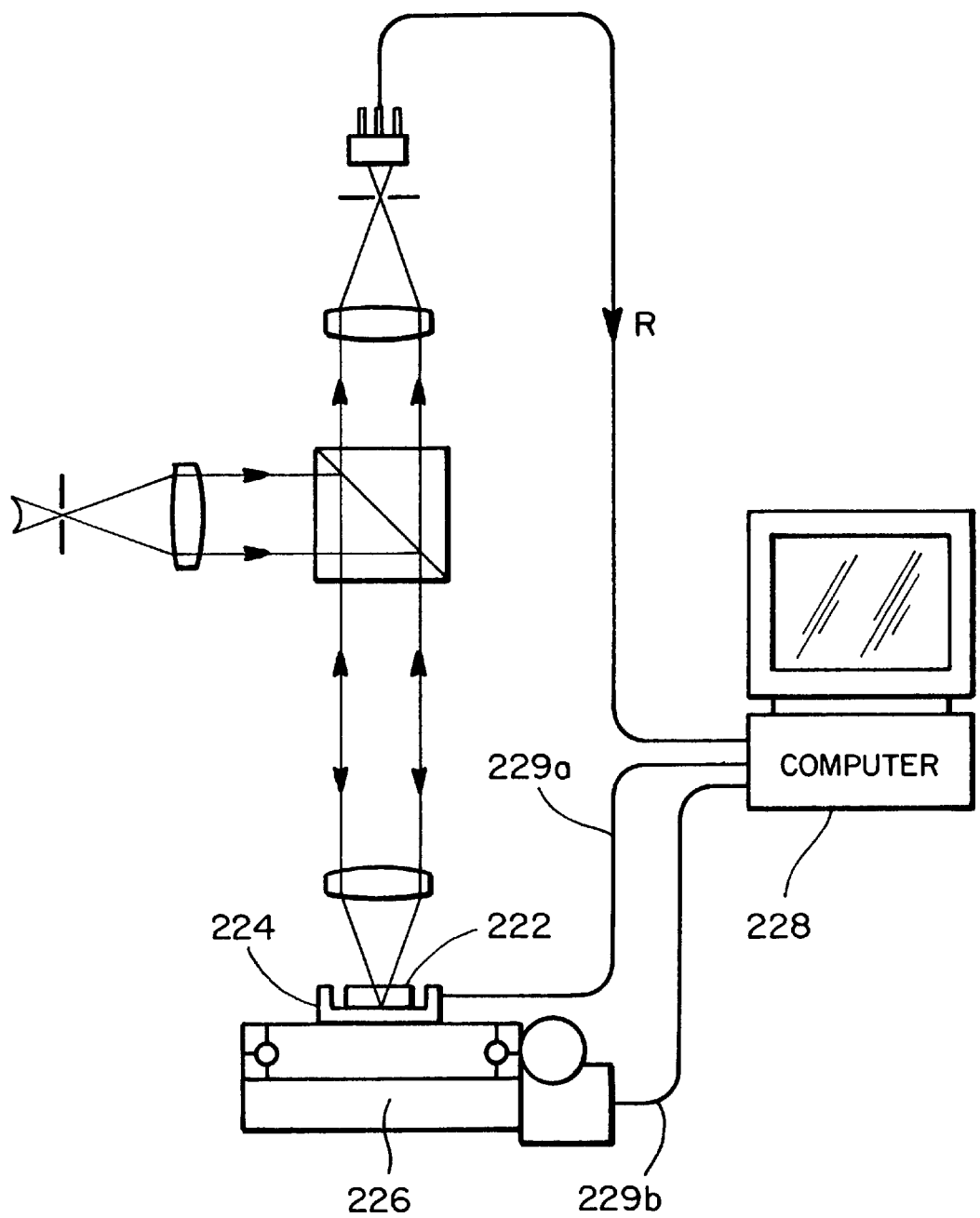
FIG_7

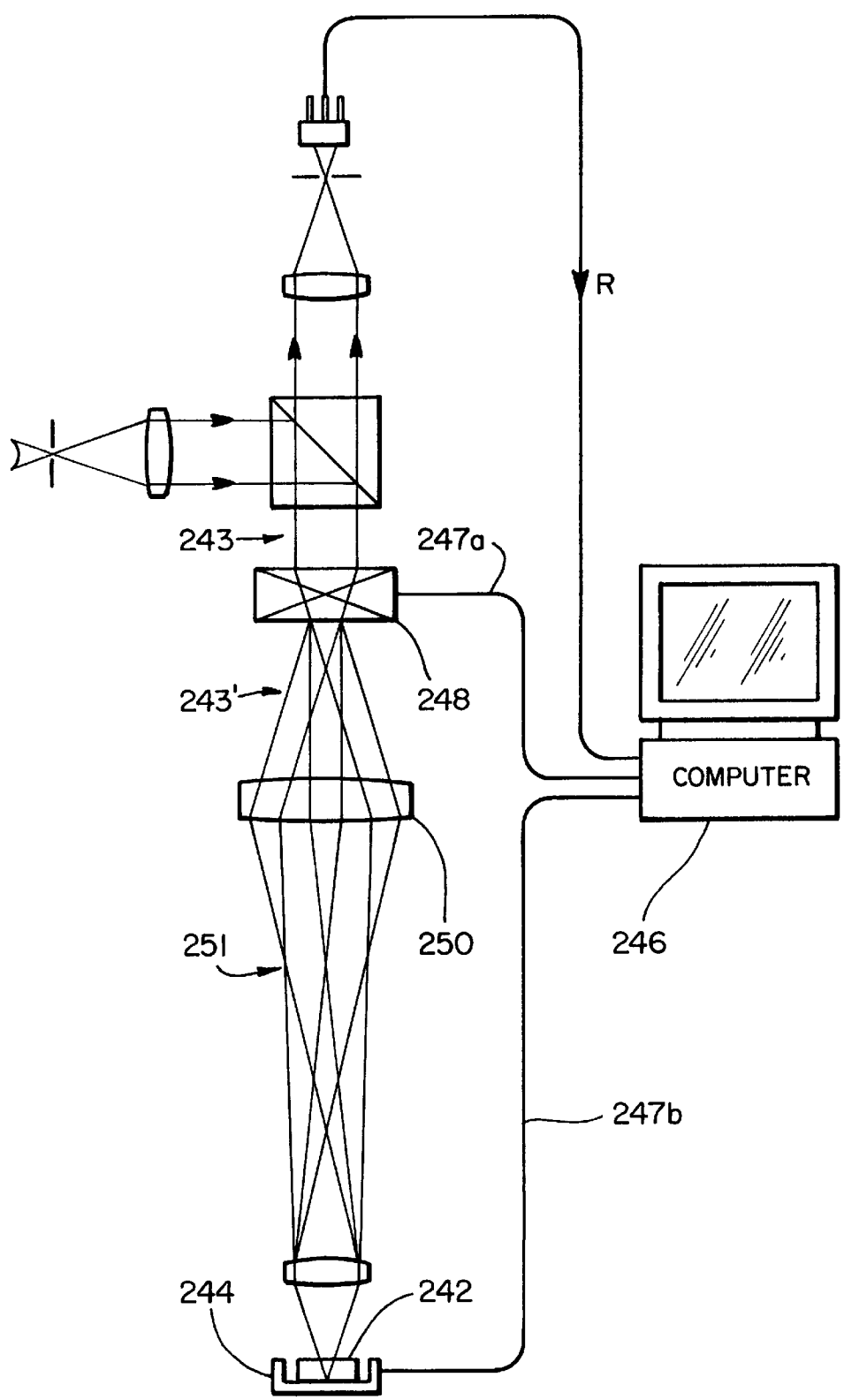
FIG_8

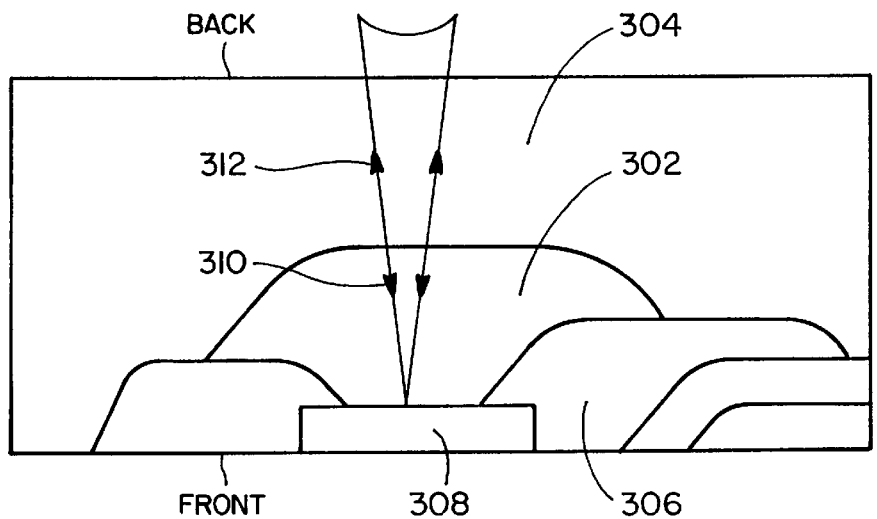
FIG_9
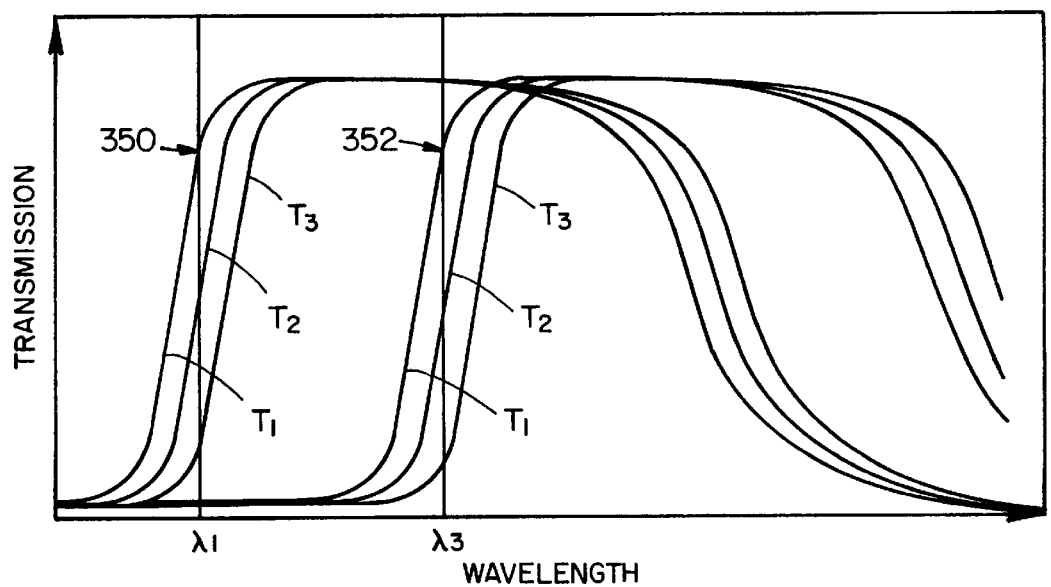
FIG_10

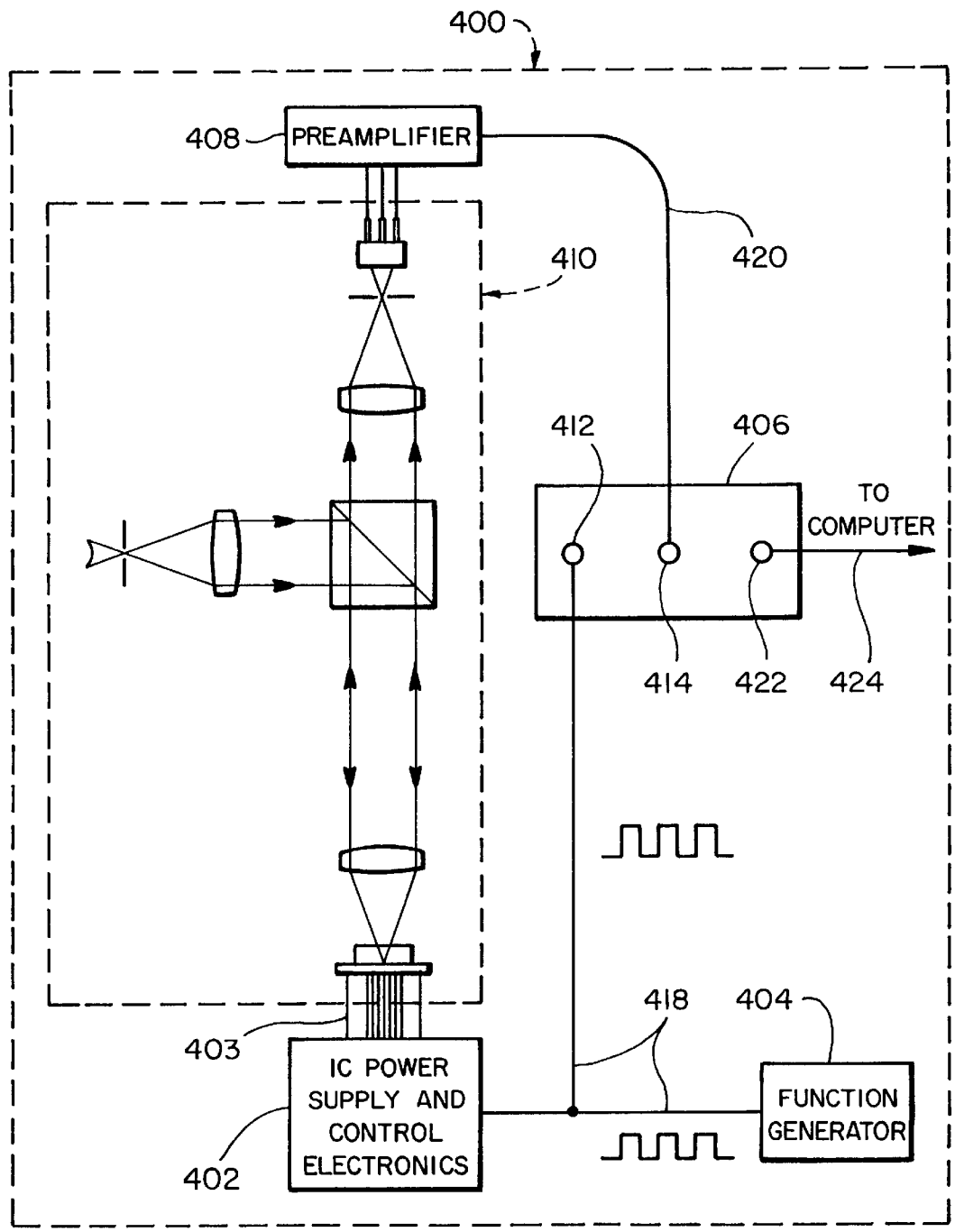
FIG_11

SYSTEM AND METHOD FOR OPTICALLY DETERMINING THE TEMPERATURE OF A TEST OBJECT

The present invention relates generally to systems for optically determining the temperature of a test object and, particularly, to systems for optically determining the temperature of a semiconductor device or integrated circuit.

BACKGROUND OF THE INVENTION

Integrated circuits comprising millions of transistors generate significant amounts of heat during operation due to the power dissipated by the transistors as they switch on and off. If this heat is not removed, the chip's operating temperature will increase, sometimes to the point of causing chip failure. Chip heating can be global, affecting the entire chip, or local, affecting just a few regions of the chip. Consequently, it is extremely important to determine how much heat all or part of an integrated circuit design generates during operation.

The heat generated by a circuit for a range of operating voltages and frequencies can be estimated using circuit simulations wherein the power dissipated by the circuit while performing various functions is determined and heating estimated therefrom. However, due to the variation in integrated circuit fabrication and operating conditions from the simulated values and inaccuracies inherent in circuit simulation, there has long been recognized a need to determine physically the temperature of all or part of an integrated circuit during actual operation.

Another reason for physically measuring integrated circuit (IC) temperature is that, often, IC defects are indicated by local hot spots that occur during operation. Such defects cannot be predicted with simulation. Consequently, it is common in IC fabrication for engineers to locate defects by searching for hot spots while exercising the IC with test patterns. There are two widely-used, optical methods for accomplishing such temperature measurements of ICs.

Typically, an IC is selected for temperature measurement randomly or because it failed previous operational testing. In both methods, the IC is decapped so that only a thin layer of packaging material covers the active regions of the IC. Test signals are then applied to the IC's circuit pins and the resulting temperature of one or more regions of the IC is sensed using one of the two prior art methods.

The first method employs a charge-coupled device (CCD) sensitive to infrared radiation to image the surface of the IC during operation. The heat generated by an IC, apart from a few very hot spots, is not intense. Thus, to generate a temperature map of the IC, the CCD must integrate over time to collect the relatively few photons emitted from regions that are less than very hot. CCD cameras with this capability/sensitivity are quite expensive. Another disadvantage of this method is that it only measures temperature at the surface of the IC. Because an IC is a multi-level device, each level of which can be at a different temperature, each temperature measurement represents a weighted average of the temperatures of the various layers in the area of the measurement. This method is therefore unable to indicate the temperatures of each layer in the measurement area.

The second method involves coating the surface of the IC with a temperature-sensitive fluorescent dye and then illuminating the surface with ultraviolet light while operating the IC. The temperature map of the IC surface is then determined by observing the color or amount of fluorescence. This method is cumbersome and, like the first method, cannot look inside the IC to determine the respective temperatures of the IC's multiple layers. Moreover, this method is difficult to calibrate given variances in the fluorescent dye employed and imprecision in correlating the degree of fluorescence with temperature. Also, the fluorescent dyes require special handling (e.g., they must be used with adequate venting), which makes this technique even more cumbersome.

In addition to the problems mentioned above, these methods cannot be used successfully with ICs packaged with the new "flip-chip" technology. Flip-chip technology enables large numbers of IC inputs and outputs to be coupled to external pins without conventional and space-consuming lateral leads. Referring to FIG. 1, in a flip-chip 50 the IC 52 is formed on a semiconductor substrate 54 in the conventional manner. Conductive nubs 56 connected to IC inputs and outputs mate with conductive regions 58 of a carrier 60. The conductive regions 58 connect to respective external contacts 62. Because the IC 52 is sandwiched between the carrier and the substrate its temperature and hot spots are very difficult or impossible to evaluate from surface measurements.

One problem with using conventional methods to look at hot spots from the backside of a chip is measurement smearing due to heating of the chip substrate between the hot spot and the measurement point. For example, when measured from the backside of a 500 micron-thick wafer, smearing causes a 10 micron hot spot to appear to be 500 microns when measured.

Therefore, there is a need for an optical temperature measurement system that is precise and relatively simple to operate and that can be used to look inside the IC being tested to determine the respective temperatures of the IC's layers.

There is also a need for an optical temperature measurement system that addresses the problem of measurement smearing associated with using conventional measurement techniques from the backside of an integrated circuit.

SUMMARY OF THE INVENTION

In summary, the present invention is a laser temperature measurement system and method that can be used to determine the temperature of different layers of an integrated circuit while the circuit is operating.

In particular, the present invention is a system and method for determining the operating temperature of an IC as a function of the absorptivity of the IC's semiconductor substrate to selected wavelengths of light. In the present invention, an IC whose temperature is to be measured is illuminated through the backside by a focused light beam (e.g., a laser beam), which is then reflected from one or more of the IC's reflecting internal structures. The intensity of the reflected beam is measured by an optical sensor. The absorption coefficient of the illuminated region of the IC substrate through which the light beam traveled is determined as a function of the intensities of the incident and reflected light and other factors, such as the surface reflectivity of the IC.

The absorption coefficient of a material at a particular illumination wavelength is a known function of temperature and impurity characteristics (i.e., dopant type and concentration). Therefore, assuming the average doping characteristics of the region are known, it is possible using the present invention to determine the average temperature of the illuminated region from the known material characteristics and the absorption coefficient determined for that region.

For situations where the doping characteristics are not precisely known, the present invention provides a calibration procedure wherein a set of absorption curves is generated for one or more regions of the IC substrate, each of the curves representing the absorption coefficient of one region as a function of temperature at one illumination wavelength. Thus, the temperature of a region can be determined by comparing the measured absorption of that region to the absorption curves generated during the calibration procedure.

Typically, the adjacent IC and substrate layers through which the light beam travels during a single measurement have very different doping characteristics and commensurately different absorption coefficients. The present invention recognizes that, for such adjacent layers, there is a defined set of wavelengths at which the absorption values of one set of absorption curves are relatively constant and at which the absorption values of the other set of absorption curves are changing rapidly. The present invention acts on this observation by making absorption measurements at the defined set of wavelengths so as to be able to independently measure the temperature of one or the other of the layers.

A preferred embodiment of the present invention improves the sensitivity and spatial resolution of the temperature measurements using a lock-in technique wherein the temperature of the IC being tested is modulated at a specific frequency. The present invention then measures the temperature changes of the circuit at the modulation frequency using a lock-in amplifier. This measurement method enables the present invention to detect weak, normally undetectable signals in the presence of a strong noise background.

A basic preferred embodiment of the present invention includes a laser, a beam expander, a beam splitter, an objective lens, a focusing lens and a photo-detector. The laser generates a laser beam, which is expanded by the beam expander into an expanded beam that is diverted by the beam splitter towards the objective lens. The objective lens focuses the beam onto a region of the IC under measurement. The beam reflects from the IC, is collimated by the objective lens, passes through the beam splitter and is focused by the focusing lens onto the photo-detector. The photo-detector measures the intensity of the received light, from which the absorption coefficient of the measured region is determined.

Other preferred embodiments employ confocal measurement systems and techniques that eliminate the effect of reflections from the top surface of the IC. These confocal systems and techniques provide higher signal to noise ratios than non-confocal systems and techniques.

In any of the embodiments, a temperature map of the entire IC under measurement can be produced by mechanically scanning the IC through the incident light or by optically scanning the light across the IC, which remains stationary. At each scan point the absorption coefficient and temperature are determined.

Any of the embodiments can be employed to determine IC operating temperatures at a resolution suited to locating possible IC defects or to evaluate IC performance based on the internal operating temperatures for different regions of the IC. The preferred embodiments are well-adapted to measure operating temperatures of ICs packaged as flip-chips due to the ability of the embodiments to focus light through the backside of the substrate onto the features of the IC whose heating is to be evaluated.

BRIEF DESCRIPTION OF THE DRAWINGS

Additional objects and features of the invention will be more readily apparent from the following detailed description and appended claims when taken in conjunction with the drawings, in which:

FIG. 1 is a diagram illustrating the construction of an IC packaged with conventional flip-chip 50 technology;

FIG. 2 is a plot of light absorption coefficient versus temperature at an unspecified wavelength for a semiconductor material;

FIG. 3 is a block diagram of a basic embodiment of the present invention for measuring the internal temperature of an integrated circuit;

FIG. 4 is a depiction of a substrate 54 showing transmissions $t_i$, $t_s$ and reflection r that influence the measurement of through-substrate reflectivity;

FIG. 5 is a plot of the signal generated by the photo-detector of FIG. 2 versus IC temperature;

FIG.6A is a block diagram of a preferred embodiment of the present invention employing confocal techniques to reduce the effect of undesirable reflections from the IC;

FIG. 6B is a block diagram of another preferred embodiment of the present invention employing confocal techniques to reduce the effect of undesirable reflections from the IC;

FIG. 7 is a block diagram of a preferred embodiment wherein the IC is scanned past the probe beam to allow a temperature map to be made of the IC;

FIG. 8 is a block diagram of a preferred embodiment wherein the beam is scanned across the IC to allow a temperature map to be made of the IC;

FIG. 9 illustrates a cross-section of a typical IC;

FIG. 10 is a plot of light transmission versus wavelength for a plurality of temperatures for two IC layers with different doping characteristics; and FIG. 11 is a block diagram of a preferred embodiment employing a lock-in amplifier.

DESCRIPTION OF THE PREFERRED EMBODIMENT

Referring to FIG. 2, there is shown a plot 90 of the light absorption coefficient of a semiconductor as a function of temperature. The light absorption coefficient of a material is a fraction that defines the relative transparency of the material to light at a particular wavelength. For example, for wavelengths to which a material is transparent the material's absorption coefficient is near zero and for wavelengths to which the material is opaque its absorption coefficient is a positive value. The present invention recognizes that the absorption coefficient of a semiconductor varies with the temperature of the semiconductor and employs this recognition to determine the semiconductor's temperature by measuring its absorption coefficient or, equivalently, its light transmission. Specifically, the present invention first determines the absorption coefficient of a semiconductor and then derives the temperature from an appropriate absorption curve of the type shown in FIG. 2.

Referring to FIG. 3, there is shown a block diagram of a basic embodiment 100 of the present invention for measuring the internal temperature of an integrated circuit. The embodiment 100 includes a laser light source 102, a beam expander 104, a beam splitter 106, an objective lens 108, an integrated circuit (IC) 110 whose temperature is to be measured, a focusing lens 112 and a photo-detector 114.

The laser 102 generates a laser beam 103, which is expanded by the beam expander 104 and then partially reflected by the beam splitter 106 towards the objective lens 108. The objective lens 108 focuses the incident light 109 onto a selected region of the circuit 110 through the backside of the IC. The light 111 reflected from the circuit 110 is collected by the objective lens 108, passes through the beam splitter 106 and is re-focused onto the photo-detector 114 by the focusing lens 112. The photo-detector 114 generates an electrical signal R that represents the strength of the detected light 111'. The signal R is then digitized and recorded by a computer (not shown), which determines the absorption coefficient/transmission of the IC and derives its temperature therefrom.

The photo-detector 114 operates as a linear device. Its output signal R is proportional to the strength of the detected light 111', which is in turn proportional to the amount of light reflected from the circuit through the IC substrate. Thus, the signal R serves as a direct measurement of the through-substrate reflectivity of the circuit.

The through-substrate reflectivity (TSR) can be represented as follows:

$$TSR = t_i \times t_s \times r \times t_s \times t_i = r \times t_s^2 \times t_i^2, \quad (1)$$

where r is the optical reflectivity of the circuit measured at the substrate, $t_i$ is the optical transmission of the air-substrate interface and $t_s$ is the single path optical transmission through the substrate, which can be expressed as:

$$t_s = e^{-\int_0^d \alpha(T'(z))dz}, \quad (2)$$

where d is the thickness of the IC substrate, T'(z) is the temperature of the substrate at depth z measured from the back surface of the IC, $\alpha(T'(z))$ is the optical absorption coefficient of the substrate at depth z, which is a function of the temperature at that point. Referring to FIG. 4, there is shown a diagram of a semiconductor substrate 54 on which the quantities used in the previous equations are depicted. As in FIG. 1, the IC features 52 are illuminated through the backside of the substrate 54. For clarity, the quantities $t_i$, $t_s$ and r are shown for two different features 52, but each measurement of the reflectivity TSR, indicated by the signal R, is affected by all of these quantities. In FIG. 4 the incident light is represented by the variable $l_o$ and an internal version of the incident light is represented by the variable $l_1$, where $l_1 = l_o \times t_i \times t_s$.

Referring again to FIG. 3, given a typically thin IC substrate, the temperature of the substrate is assumed to be almost constant along a line perpendicular to its surface and approximately the same as the temperature of the circuit 110 underneath. Thus, Eq. (2) can be simplified as:

$$t_s = e^{-\alpha(T)d}, \quad (3)$$

In view of Eq. (3), Eq. (1) can be rewritten as follows:

$$TSR = t_i^2 r e^{-2\alpha(T)d}. \quad (4)$$

Referring to FIG. 5, there is shown a plot 130 of the through-substrate reflectivity (corresponding to the signal R generated by the photo-detector 114 of FIG. 3) for a typical silicon-based IC. It is evident from the plot 130 that each measured value R of the through-substrate reflectivity TSR corresponds to a specific temperature T. Therefore, by measuring the circuit's through-substrate reflectivity, the present invention is able to determine the temperature of the circuit. However, before a measured through-substrate reflectivity can be correlated to an unknown temperature, it is first necessary to calibrate the measurement system by measuring the through-substrate reflectivity of the circuit at several known temperatures. For example, referring to FIG. 5, during calibration the reflectivities R0 and R1 might be measured at the known temperatures T0 and T1, respectively. Then, using linear or non-linear curve-fitting, the temperature T of the circuit can be extrapolated from the calibration measurements.

For example, using linear curve fitting as applied to the measurements shown in FIG. 5, the IC temperature can be approximately represented as:

$$T(R) = \frac{(T_1 - T_0)(R - R_0)}{R_1 - R_0} = \frac{(T_1 - T_0) \times R_0}{R_1 - R_0} \times \left(\frac{R}{R_0} - 1\right) \quad (5)$$

For wider measurement range and higher accuracy, the laser temperature measurement probe is preferably calibrated at multiple temperatures distributed over an extended temperature range. The circuit temperature can then be determined from a particular measurement by performing interpolation on the two neighboring calibration measurements.

The laser measurement probe 100 of FIG. 3 has one drawback: the reflection from the back surface of the IC mixes with the reflection from the circuit itself, reducing the signal to noise ratio of the through-substrate reflectivity measurement R. A confocal setup reduces the effects of these undesirable reflections and therefore increases the measurement signal to noise ratio. Two preferred confocal laser temperature probe configurations are now described in reference to FIGS. 6A and 6B.

Referring to FIG. 6A, there is shown a first preferred confocal setup including a laser light source 162, a first pinhole 164, a collimating lens 166, a beam splitter 168, an objective lens 170, a focusing lens 176, a second pinhole 178 and a photo-detector 180. The light from the light source 162 is intercepted by the first pinhole 164, which acts as a point source for the incident light 165. The incident light 165 is collimated by the collimating lens 166 and diverted towards the objective lens 170 by the beam splitter 168. The objective lens 170 focuses the light onto the circuit 172 through the backside 174 of the IC substrate. Light 173 reflected from the circuit 172 and the backside 174 of the substrate is transmitted by the beam splitter 168 to the focusing lens 176, which focuses the light 173 onto the second pinhole 178. The second pinhole 178 is placed so that it transmits to the photo-detector 180 only that portion of the light 173 reflected from the circuit 172. That is, the pinhole 178 eliminates a substantial amount of "unfocused light", including the light reflected from the package back 174. Due to the elimination of unfocused light, the system 160 operates at a higher signal to noise ratio than the embodiment of FIG. 3.

Referring to FIG. 6B, there is shown a second preferred confocal temperature measurement system 190 including a light source 192, a beam splitter 194, a pinhole 196, a tube lens 198, an objective lens 200, a relay lens 206 and a photo-detector 208. In contrast to the confocal measurement system shown in FIG. 6A, this embodiment includes a single pinhole 196, which acts as a point source for the incident light 197 and removes the unfocused light (including light reflected from the back 204 of the IC 202) from the reflected light 205. The tube lens 198 and the objective lens 200 focus the incident light 197 onto the circuit 202 and the reflected light 205 onto the pinhole 196. The reflected light 195 that passes through the pinhole/point source 196 is transmitted by the beam splitter 194 to the relay lens 206, which focuses the light 195 onto the photo-detector 208. Because the light 195 predominantly includes only that part of the light 205 reflected from the IC 202, the signal R generated by the photo-detector 208 represents with high SNR the through-substrate reflectivity of the circuit 202.

Thus far, embodiments have been described for measuring the temperature of an IC at a single point. It is also useful to determine a temperature map for an IC under measurement. Such a map can be produced by combining the teachings of the present invention with conventional scanning confocal microscopic techniques. Scanning can be accomplished in two ways: (1) the sample can be scanned across a stationary beam, or (2) the beam can be scanned across a stationary sample. Preferred embodiments using these respective techniques are described in reference to FIGS. 7 and 8.

Referring to FIG. 7, there is shown an embodiment 220 based on the confocal measurement system of FIG. 6A wherein the IC to be measured 222 is moved across the light beam. In addition to the elements described in reference to FIG. 6A, the embodiment 220 includes a temperature control device 224 that supports the IC under measurement 222, an X–Y mechanical stage 226 that supports the temperature control device 224, and a computer 228. The computer 228 controls the temperature control device 224 and the mechanical stage 226 and processes measurements R from the photo-detector. In this embodiment, the computer 228 first performs a calibration step wherein it issues signals 229a to the temperature control device 222 to establish the IC 222 at a known temperature and then issues a series of signals 229b to the mechanical stage 226 that cause the face of the IC 222 to be scanned across the beam. A set of measurements R is made by the computer 228 for a set of the scan positions for each temperature at which the calibration step is performed. Once calibration has been completed, the computer 228 initiates a measurement step while the chip is operating wherein through-substrate reflectivity measurements are made at the same set of scan positions. The through-substrate reflectivity measurements can be derived for each scan pixel using linear or nonlinear curve-fitting. In this way, a temperature map can be obtained of the IC during operation.

Referring to FIG. 8, there is shown a block diagram of a preferred embodiment 240 wherein the probe beam is scanned across an IC 242 to allow a temperature map to be made of the IC. This embodiment 240 is similar to that shown in FIG. 7 except that it also includes an X–Y optical scanner 248 and a scan lens 250. The X–Y optical scanner 248 intercepts the incident beam 243 transmitted by the beam splitter and, in response to control signals 247a from the computer 246, scans the beam 243' across the face of the scan lens 250 in a regular X–Y pattern. The scan lens 250 forms an incident beam 251 that converges on the objective lens with an angle of incidence that depends on the region of the scan lens 250 forming the beam 251. The objective lens in turn focuses the incident beam on the IC at scan positions that depend on the angle of incidence. In this way, the beam is scanned across a stationary sample 242. The temperature of the sample 242 is set by the temperature control device 244 in response to control signals 247b from the computer 246. Calibration and operating measurements are made as described in reference to FIG. 7.

As mentioned above, ICs are formed from multiple layers having different electrical characteristics. For example, referring to FIG. 9, there is shown a cross-section of a typical IC (back side up) including doping regions 302, 304, at least one oxide layer 306 and a reflective surface 308, such as a metal contact. Typically, the regions 302, 304, 306 have different respective light absorption properties at a given temperature and illumination wavelength. Consequently, assuming that the IC is illuminated by an incident beam 310, the through-substrate reflectivity indicated by the intensity of the reflected beam 312 is an accumulation of the absorptivities and therefore a function of temperatures of the doping regions 302 and 304. However, depending on the types of layers through which the beams 310, 312 travel, the wavelength of illumination can be selected so that the temperature of one or the other of the regions can be individually determined. This wavelength selection technique is now described in reference to FIG. 10.

Referring to FIG. 10, there are shown plots 350, 352 of light transmission versus wavelength for a plurality of temperatures T1, T2, T3 for the first and second doped layers 302, 304 (FIG. 9). It is apparent from FIG. 10 that at the wavelength $\lambda_1$ the optical transmission 350 of the first doped region changes much more rapidly with temperature than that 352 of the second doped region. In other words, at the wavelength $\lambda_1$ the optical transmission of the first doped region is much more sensitive to temperature variation than that of the second doped region. Thus, in any of the described embodiments, probing the IC at the wavelength $\lambda_1$ predominantly restricts the temperature measurement to the first doping region. Similarly, by probing the IC at the wavelength $\lambda_2$ the temperature measurement is predominantly restricted to the first doping region.

To further increase the measurement sensitivity and spatial resolution, one may use a lock-in technique. The lock-in technique requires modulating, at a specific frequency, the temperature of the circuit under test. By measuring the temperature changes of the circuit at the modulation frequency using a lock-in amplifier, weak, normally undetectable signal can be detected from a strong noise background. The lock-in technique provides another benefit: it can enhance the spatial resolution of the measurement. A preferred embodiment employing a lock-in amplifier is now described in reference to FIG. 11.

Referring to FIG. 11, unique components of a measurement system 400 include an IC power supply and control electronics block 402, a lock in amplifier 406, a function generator 404 and a preamplifier 408. The remaining components 410, which include an IC under measurement, a photo-detector and optical components, are interchangeable with similar components of any of the embodiments described in reference to FIGS. 2, 6A, 6B, 7 and 8. That is, the lock-in technique described in reference to FIG. 11 can be employed in any system embodying teachings of the present invention.

The lock-in amplifier 406 has reference and signal inputs 412, 414 that respectively receive a modulation signal 418 from the function generator 404 and a preamplified signal 420 from the preamplifier 408. The lock-in amplifier 406 provides a temperature signal 424 on an output 422 that is coupled to a computer (not shown). As described above, the lock-in amplifier 406 measures the temperature changes of the circuit (represented by the preamplified signal 420) at the frequency of the modulation signal 418, which is also coupled to the IC power supply and control electronics 402. The IC power supply and control electronics block 402 can respond to the modulation signal 418 in many ways, the object of each way being to modulate the temperature of the IC under measurement via control signals 403, which are coupled to the IC under measurement via power and signal wires. For example, the block 402 can change the test patterns on the IC signal wires and/or the level of the power on the power wires. The basis of the lock-in technique and a few preferred measurement methods employing the lock-in technique are now described. These methods are only exemplary and are not intended to limit the scope of the present invention; the present invention applies to these and all similar methods.

Due to the heat capacitance and limited thermal conductivity of the IC substrate and circuits, the temperature modulation caused by a modulated heat source is limited to the region close to the heat source. The size of the region is usually comparable to the wavelength of the heat wave, which is inversely proportional to the modulation frequency. The higher the modulation frequency, the smaller the temperature modulation region is. Thus, by measuring at a high frequency, the spatial resolution of the measurement is greatly increased.

The easiest way to achieve temperature modulation of the circuit is to modulate its heat generation. There are several methods to modulate the heat generation. The first and the simplest method is to turn on and off the power to the circuit under test. When the power to the IC is on, heat is generated and the temperature of the circuit increases. However, when the power to the IC is off, no heat is generated and the temperature of the circuit decreases due to heat dissipation. This method is simple and straightforward, but its application is very limited because it disrupts the normal operation of the circuit under test.

The second method is to modulate the supply voltage or current of the IC around its nominal value. The modulation amplitude should be limited to a level so that the IC still functions properly. Since variation in supply voltage or current changes the amount of heat generated by the circuit, the temperature near the circuit is modulated. This method is relatively simple and is capable of probing circuits under normal operating condition, but has limited modulation amplitude.

The third method involves controlling the test pattern to the circuits. It is a common knowledge that circuits at different states generate different amount of heat and circuits switching from one state to another generate more heat than those at static states. By choosing a periodic test pattern in such a way that one part of the pattern exercises the circuits to generate more heat than the remaining part of the pattern, the heat generation of the circuits is thus modulated. The heat modulation frequency is naturally the repetition rate of the test pattern. A simple example of this method employs such a test pattern that one part of the pattern runs the circuits at a high clock rate, causing more heat generation while the remaining part of the test pattern slows down or freezes the clock, resulting in less heat generation. Other examples require careful selection of test pattern.

The fourth method involves switching on and off the power to the circuits in synchronization with the test pattern. The circuits need to be initialized to the same state each time when the power is applied. Obviously the heat generation of the circuit is modulated.

The fifth method is to turn on and off the power to the IC with a random test pattern. Since the clock frequency is much higher (in hundreds of MHz) than the on/off modulation frequency of the power supply (in tens of kHz), the heat generation during the power-on period is averaged over several thousands of clock cycles of random test pattern, therefore the amount of the heat generated is almost the same from one modulation cycle to another. Again, since no heat is generated during power-off period, heat generation is modulated as the power to the circuits is switched on and off.

With conventional fluorescence method, due to heating of IC substrate, the hot spot spreads or smears as it propagates from its origination point to the surface of the backside substrate, where the measurement is carried out. The smearing of the hot spot at the surface is comparable in size to the distance from the heat source to the measurement point, i.e., the IC Substrate thickness, typically 500 μm. Since the laser temperature measurement technique measures the temperature right at the heat source, its measurement resolution is limited only by its laser spot size, which can be approximately expressed as:

$$d = \frac{1.22\lambda}{NA}$$

where d is the diameter of laser spot, λ is the optical wavelength of the laser. NA is the numerical aperture of the objective. For a typical setup, λ=1.064 μm and NA=0.85, the measurement resolution is d=1.5 μm.

In any of the above-described system configurations the backside of the IC substrate may be polished and coated with an anti-reflection coating (ARC). The resulting system will have better measurement sensitivity than an equivalent system without these improvements.

Any of the embodiments can be employed to determine IC operating temperatures at a resolution suited to locating possible IC defects or to evaluate IC performance based on the internal operating temperatures for different regions of the IC. The preferred embodiments are well-adapted to measure operating temperatures of ICs packaged as flip-chips due to the ability of the embodiments to focus light through the backside of the substrate onto the features of the IC whose heating is to be evaluated.

The principles, methods and techniques we described above can be used for measuring any types of semiconductor circuits, including but not limited to silicon, germanium and GaAs ICs.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for determining internal temperature of an integrated circuit (IC) formed on a semiconductor substrate, comprising:
    (1) focusing through the backside of the substrate an incident light beam of a selected wavelength at a measurement point inside the IC, the incident light beam having an incident intensity;
    (2) determining reflected intensity of a reflected light beam provided by reflection of the incident light beam from the measurement point inside the IC;
    (3) determining absorption coefficient of a measurement region of the IC near the measurement point by comparing the incident and reflected light beam intensities; and
    (4) based on absorptivity curves characterizing the measurement region for a plurality of temperatures encompassing the internal temperature, each of the absorptivity curves relating absorptivity to illumination wavelength for a respective temperature, determining from the absorption coefficient the internal temperature near the measurement point.

2. The method of claim 1, further comprising:
    generating the absorptivity curves by performing a calibration operation wherein the temperature of the IC is set to a plurality of respective temperature settings at which the absorptivity of the measurement region is measured according to steps (1)–(3).

3. The method of claim 1, further comprising:

repeating steps (1)–(4) for a plurality of measurement points inside the IC so that a temperature map for the IC at the plurality of measurement points is determined.

4. The method of claim 1, further comprising:

when the measurement region includes a plurality of layers with different absorptivities for each of a set of optimal wavelengths, setting the selected wavelength to one of the optimal wavelengths; such that the absorption coefficient predominantly represents the absorptivity of one of the layers whose transmission properties are most sensitive at the selected wavelength to temperature variations.

5. The method of claim 4, wherein the different layers comprise semiconductor layers with different respective doping characteristics.

6. The method of claim 1, further comprising:

modulating the temperature of the IC circuit at a specific modulation frequency; and performing steps (1)–(4) at the modulating frequency.

7. The method of claim 6, wherein steps (2)–(4) are performed using lock-in techniques.

8. The method of claim 6, wherein the step of modulating the temperature comprises one of:

(a) modulating heat generated by the IC;

(b) modulating supply voltage to the IC around a nominal voltage value;

(c) modulating supply current to the IC around a nominal current value;

(d) issuing a periodic set of test patterns to the IC whose period is locked to the modulation frequency, each of the test patterns being associated with a different level of heat generation by the IC; and (e) switching on and off power to the IC in synchronization with changes in a test pattern issued to the IC.

9. The method of claim 1, further comprising:

randomly switching on and off the power to the IC in accordance with a test pattern having a mean switching frequency that is lower than the clock frequency of clock signals driving the IC; and performing the steps (1)–(4) in accordance with the test pattern.

10. The method of claim 1, wherein step (1) is performed using confocal measurement techniques.

11. The method of claim 1, further comprising:

determining from the internal temperature defects in the IC.

12. The method of claim 1, further comprising:

evaluating based on the internal temperature operating performance of the IC.

13. The method of claim 1, further comprising:

prior to steps (1)–(4), polishing the backside of the substrate so as to enhance measurement sensitivity.

14. The method of claim 13, further comprising:

following the polishing step, depositing on the backside an anti-reflection coating (ARC) to further enhance the measurement sensitivity.

15. A method of determining temperature of a semiconductor comprising:

measuring light absorption coefficient of the semiconductor; and determining from known light absorption properties of the semiconductor as a function of temperature and the measured light absorption coefficient the temperature of the semiconductor.

16. The method of claim 15, further comprising:

generating the known light absorption properties by performing a calibration operation wherein the temperature of the semiconductor is set to a plurality of respective temperature settings at which the absorption coefficient of the measurement region is measured.

17. The method of claim 15, further comprising:

measuring the light absorption coefficient for measurement points inside the semiconductor at a plurality of different layers; and determining a temperature map for the semiconductor at the plurality of measurement points in the IC.

18. The method of claim 15, further comprising:

when the semiconductor includes a plurality of layers with different absorption coefficients for each of a set of optimal wavelengths, measuring the light absorption coefficient at a measuring wavelength that is one of the optimal wavelengths; such that the light absorption coefficient predominantly represents the absorptivity of one of the layers whose transmission properties are most sensitive at the measuring wavelength to temperature variations.

19. The method of claim 17, wherein the different layers comprise semiconductor layers with different respective doping characteristics.

20. A system for determining internal temperature of an integrated circuit (IC) formed on a semiconductor substrate, comprising:

(1) a light source configured to focus through the backside of the substrate an incident light beam of a selected wavelength at a measurement point inside the IC, the incident light beam having an incident intensity;

(2) a light receiver configured to receive and determine reflected intensity of a reflected light beam provided by reflection of the incident light beam from the measurement point inside the IC;

(3) a measurement processor configured to determine absorption coefficient of a measurement region of the IC near the measurement point by comparing the incident and reflected light beam intensities and, based on absorptivity curves characterizing the measurement region for a plurality of temperatures encompassing the internal temperature, each of the absorptivity curves relating absorptivity to illumination wavelength for a respective temperature, determining from the absorption coefficient the internal temperature of the measurement region.

21. The system of claim 20, wherein:

the light source comprises:

a laser configured to generate a laser beam;

a beam expander configured to generate from the laser beam an expanded laser beam;

a beam splitter configured to reflect the expanded laser beam towards the IC as the incident light beam; and an object lens configured to focus the incident light beam from the beam splitter onto the measurement point; and the light receiver comprises:

the objective lens, which is configured to generate from the reflected light beam a collimated reflected beam;

the beam splitter, which is configured to transmit the collimated reflected beam; and a focusing lens, which is configured to focus the collimated reflected beam transmitted by the beam splitter onto a photo-detector;

the photo-detector being configured to determine the reflected intensity in the beam from the focusing lens.

22. The system of claim 21, wherein:

the beam expander comprises:
 a first pinhole situated to intercept the laser beam; and
 a collimating lens situated between the first pinhole and the beam splitter to collimate the light from the first pinhole;

further comprising:
 a second pinhole situated between the photo-detector and the focusing lens configured to transmit to the photo-detector light reflected from the measurement region while substantially excluding light reflected from other regions of the IC and the substrate.

23. The system of claim 20, further comprising:

a first pinhole configured in relation to the light source so as to form the incident light as if from a point source; and a second pinhole situated to intercept light reflected from the IC so as to transmit to the light receiver light reflected from the measurement region while substantially excluding light reflected from other regions of the IC and the substrate.

24. The system of claim 20, wherein:

the light source comprises:
 a source of converging light;
 a beam splitter configured to reflect the converging light towards the IC as the incident light beam;
 a pinhole configured to transmit only portions of the incident light beam as if from a point source; and
 a lens assembly configured to focus the incident light beam from the beam splitter onto the measurement point; and the light receiver comprises:
 the lens assembly, which is configured to generate from the reflected light beam a converging reflected beam;
 the pinhole, configured to transmit to the beam splitter only portions of the converging reflected beam reflected from the measurement region and to exclude light reflected from other regions of the IC and the substrate, the pinhole acting as a point source of diverging light;
 the beam splitter, which is configured to transmit the diverging light; and
 a relay lens, which is configured to focus the diverging light transmitted by the beam splitter onto a photo-detector;
 the photo-detector being configured to determine the reflected intensity in the beam from the relay lens.

25. The system of claim 20, further comprising:

a scanner configured to move the incident light beam with respect to the IC in a pattern selected so as to enable the measurement processor to generate a map of reflected intensity measurements for different measurement regions within the IC.

26. The system of claim 25, wherein the scanner comprises:

a mechanical scanner configured to scan the incident light beam across the IC.

27. The system of claim 25, wherein the scanner comprises:

an optical scanner configured to scan the incident light beam across the IC.

28. The system of claim 20, further comprising:

a temperature control device configured to control temperature of the IC to enable the measurement processor to perform calibration measurements on the IC, the calibration measurements forming the absorptivity curves.

29. The system of claim 20, further comprising:

a signal and power connector configured to supply control signals and power to the IC, the signal and power connector being configured to vary at least a subset of the control signals and the power in accordance with a modulation pattern so as to modulate the internal temperature of at least a sub-region of the IC and, as a result, the reflected intensity determined by the light receiver.

30. The system of claim 29, further comprising:

a function generator configured to generate a modulation waveform defining the modulation pattern, the modulation waveform being coupled to the signal and power connector, which generates the subset of the control signals and the power in response to the modulation waveform; and a lock-in amplifier with a first input coupled to an intensity signal from the light receiver indicating the reflected intensity and a second input coupled to the modulation waveform, the lock-in amplifier being configured to sample the intensity signal in response to the modulation waveform;

the sampled intensity signal being coupled to the measurement processor, which is configured to determine therefrom the absorption coefficient.

31. The system of claim 29, wherein the temperature of the IC is modulated in at least one of the following ways:

(a) modulating heat generated by the IC;

(b) modulating power voltage to the IC around a nominal voltage value;

(c) modulating power current to the IC around a nominal current value;

(d) issuing a periodic set of test patterns to the IC via the control signals whose period is locked to the modulation pattern, each of the test patterns being associated with a different level of heat generation by the IC; and (e) switching on and off the power to the IC in synchronization with changes in the test pattern.

32. The system of claim 20, wherein:

the measurement processor is configured to generate the absorptivity curves by performing a calibration operation wherein the temperature of the IC is set to a plurality of respective temperature settings at which the absorptivity of the measurement region is measured using the light source, light receiver and measurement processor.

33. The system of claim 20, wherein:

the measurement processor is configured to determine the absorption coefficient for a plurality of measurement points inside the IC so that a temperature map for the IC at the plurality of measurement points is determined.

34. The system of claim 20, wherein:

when the measurement region includes a plurality of layers with different absorptivities for each of a set of optimal wavelengths, the measurement processor is configured to set the selected wavelength to one of the optimal wavelengths; such that the measured absorption coefficient predominantly represents the absorptivity of the layer with the highest absorption coefficient at the selected wavelength.

35. The system of claim 34, wherein the plurality of layers comprise semiconductor layers with different respective doping characteristics.

36. The system of claim 20, wherein the light source and the light receiver are configured to employ confocal techniques so as to eliminate substantially from consideration by the measurement processor reflections outside the measurement region.

37. The system of claim 20, wherein:
the measurement processor is configured to determine from the internal temperature defects in the IC.

38. The system of claim 20, wherein:
the measurement processor is configured to evaluate based on the internal temperature operating performance of the IC.

39. The system of claim 20, wherein the backside of the substrate is polished and coated with an antireflection coating.

* * * * *